United States Patent
MacNeille et al.

(10) Patent No.: US 6,813,561 B2
(45) Date of Patent: Nov. 2, 2004

(54) RELATIVE POSITIONING FOR VEHICLES USING GPS ENHANCED WITH BLUETOOTH RANGE FINDING

(75) Inventors: Perry Robinson MacNeille, Lathrup Village, MI (US); Ronald Hugh Miller, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 10/396,878

(22) Filed: Mar. 25, 2003

(65) Prior Publication Data

US 2004/0193372 A1 Sep. 30, 2004

(51) Int. Cl.[7] ............ G01S 5/02; G01S 13/93; H04Q 7/20
(52) U.S. Cl. ............ 701/213; 701/207; 455/411
(58) Field of Search ............ 701/207, 213; 455/41.2, 411, 517; 342/72, 60, 195; 340/933, 991, 571, 572.1, 825.49

(56) References Cited

U.S. PATENT DOCUMENTS

| | | | |
|---|---|---|---|
| 3,778,823 A | 12/1973 | Sato et al. | 343/7 ED |
| 5,479,173 A | 12/1995 | Yoshioka et al. | 342/70 |
| 5,617,085 A | 4/1997 | Tsutsumi et al. | 340/903 |
| 5,983,161 A | 11/1999 | Lemelson et al. | 701/301 |
| 5,999,880 A | 12/1999 | Okada et al. | 701/213 |
| 6,037,860 A | 3/2000 | Zander et al. | 340/436 |
| 6,246,376 B1 * | 6/2001 | Bork et al. | 343/760 |
| 6,268,804 B1 | 7/2001 | Janky et al. | 340/903 |
| 6,275,707 B1 | 8/2001 | Reed et al. | 455/456 |
| 6,275,773 B1 | 8/2001 | Lemelson et al. | 761/301 |
| 6,297,737 B1 * | 10/2001 | Irvin | 340/571 |
| 6,340,928 B1 | 1/2002 | McCurdy | 340/436 |
| 6,389,291 B1 | 5/2002 | Pande et al. | 455/456 |
| 6,408,232 B1 * | 6/2002 | Cannon et al. | 701/29 |
| 6,427,120 B1 * | 7/2002 | Garin et al. | 701/213 |
| 6,480,144 B1 * | 11/2002 | Miller et al. | 342/72 |
| 6,493,629 B1 * | 12/2002 | Van Bosch | 701/207 |
| 6,574,455 B2 * | 6/2003 | Jakobsson et al. | 455/41.2 |

* cited by examiner

*Primary Examiner*—Tan Q. Nguyen
*Assistant Examiner*—Dalena Tran
(74) *Attorney, Agent, or Firm*—Frank A. MacKenzie

(57) ABSTRACT

A relative vehicle positioning system for a vehicle includes a GPS antenna adapted to receive satellite signals generated in response to relative vehicle positioning and generate therefrom a GPS signal. A Bluetooth radio is adapted to exchange bearing information with a second vehicle and generate therefrom a PVT signal. A GPS unit including a controller is adapted to receive the GPS signal and the PVT signal, the GPS unit is further adapted to generate therefrom a GPS-Bluetooth relative position signal.

17 Claims, 4 Drawing Sheets

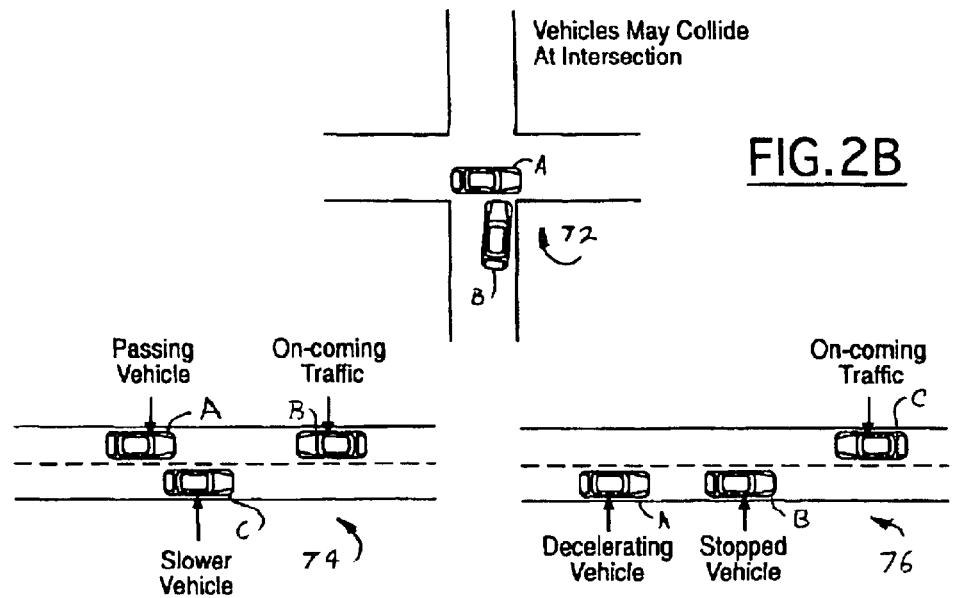
FIG. 2B
FIG. 2C
FIG. 2D
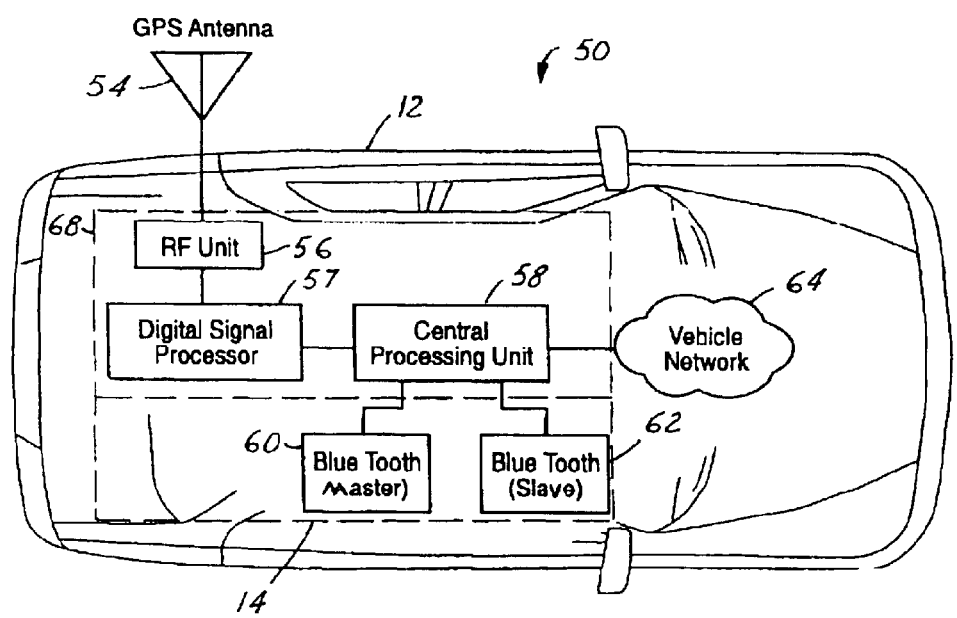
FIG. 3

RELATIVE POSITIONING FOR VEHICLES USING GPS ENHANCED WITH BLUETOOTH RANGE FINDING

TECHNICAL FIELD

The present invention relates generally to vehicle communication systems, and more particularly to a method and apparatus for communicating between multiple vehicles in close proximity to each other.

BACKGROUND OF THE INVENTION

Collision countermeasure and warning systems are becoming more widely used. These systems detect objects or vehicles within close proximity of a vehicle and perform safety operations to prevent or minimize the likelihood of a collision and any resulting injury to an occupant.

Through the development of collision countermeasure and warning systems, vehicle-to-vehicle communications have been suggested for increased vehicle awareness of other vehicles or potentially hazardous conditions that may exist within close proximity to the vehicle.

Vehicle-to-vehicle communication for safety purposes requires several distinct types of data communication. It would be beneficial if a vehicle was aware of other vehicles that may be approaching from multiple directions and at various velocities. It would also be beneficial if a vehicle was aware of various traffic conditions, such as a slow moving congested traffic situation versus a clear faster moving situation when a first vehicle may pass a second vehicle. Thus, it would be advantageous if a vehicle in motion was able to discover and communicate with other vehicles that are traveling in a concurrent manner, including vehicles approaching from a forward, rearward, or lateral direction of a first vehicle.

Traditional vehicle communication systems have a vehicle time delay discovery problem. The greater the relative speed of the vehicles, and the shorter the range of the Bluetooth devices, the more significant the synchronization time delay.

Traditional vehicle communication systems discover vehicles in close proximity under slow moving traffic conditions. Generally, during a slow moving traffic condition, vehicles tend to remain in a vehicle range for a longer period of time, allowing the vehicle to discover the other vehicles without any timing issues.

The synchronization time delay is quite evident when vehicles approach head-on because the relative speed is large and the possibility exists that they will not synchronize before they pass. It is also quite evident when the vehicles move lateral to each other because objects off the road may interfere with the signal.

The lateral approaching vehicle situation introduces an additional problem with existing vehicle communication systems. Objects between the first vehicle and the approaching vehicle may block communication signals and make detecting laterally approaching vehicles difficult. Thus, network communication is crucial to provide advanced warning of objects or potential hazards to vehicles within the network.

Ad hoc wireless mobile networks are commonly used because of their associated desirable benefits for vehicle-to-vehicle data communication including: lack of reliance on third party infrastructures, ability to adapt to local conditions readily, ability to allocate resources on a local level, and absence of single points of failure. Also, commodity implementations of ad hoc networking hardware are readily available and well proven. However, ad hoc wireless mobile networks have disadvantages associated with routing of communication signals.

Many pre-crash and crash avoidance technologies require knowledge of a vehicle location and velocity with respect to locations and velocities of other nearby vehicles. Global Positioning Systems (GPS) provide this type of information, but frequently without the necessary accuracy.

Current GPS require twenty-four operational satellites to guarantee that there are at least four above the horizon for any point on Earth at any given time.

Currently, GPS devices are connected to a computer in a vehicle equipped with a two-way digital radio for communicating with the vehicles around it. Position, Velocity and Time (PVT) data is computed in the GPS and passed to the computer, typically using the National Marine Electronics Association (NMEA) standards. The computed PVT data is exchanged between vehicles using two-way digital radios, wireless modems, or network devices such as those conforming to the IEEE 802.11, 802.1 1a, or 802.1 1b specifications. The known position and velocity vectors are subtracted to give the relative velocity vectors.

The errors attributed to the OPS receivers have not been eliminated in this way, however, and these errors are multiplied in the position calculation because they are quite sensitive to the geometric relationship between the satellites that are being used. Further, each vehicle GPS must be able to receive signals from at least four satellites simultaneously for the method to work. Buildings, overpasses and foliage may limit the number of satellite "visible" to the receivers. These factors all reduce the effectiveness of this approach as a solution to vehicle positioning for the purposes of vehicle safety, navigation and Telematics.

It would therefore be desirable to develop a wireless mobile communication network for vehicle-to-vehicle communication that is feasible to implement for various approaching vehicle situations, that overcomes the above mentioned timing and accuracy issues.

SUMMARY OF THE INVENTION

The present invention provides a method and apparatus for communicating between multiple vehicles in close proximity to each other. In accordance with one aspect of the present invention, a relative vehicle positioning system for a first vehicle includes a GPS antenna adapted to receive satellite signals generated in response to relative vehicle positioning and generate therefrom a GPS signal. A first Bluetooth radio is adapted to exchange bearing information with a second vehicle and generate therefrom a PVT signal. A GPS unit including a controller is adapted to receive the GPS signal and the PVT signal, and generate therefrom, a GPS-Bluetooth relative position signal.

In accordance with another aspect of the present invention, a method of communicating between vehicles having GPS-Bluetooth devices is provided. The method includes receiving timing and vehicle data, generating a GPS signal, computing range and velocity through Doppler shift, sharing information between the Bluetooth devices, and synchronizing the GPS-Bluetooth devices.

The GPS-Bluetooth system in the present invention improves GPS for vehicle navigation and other purposes as well as vehicle safety and pre-crash sensing.

Furthermore, the present invention utilizes multiple vehicle technologies that are widely available to minimize additional costs to a vehicle system.

Other advantages and features of the present invention will become apparent when viewed in light of the detailed description of the preferred embodiment when taken in conjunction with the attached drawings and appended claims.

BRIEF DESCRIPTION OF THE DRAWINGS

FIG. 2B is a vehicle intersection diagram in accordance with another application of the present invention;

FIG. 2C is a vehicle passing diagram in accordance with another application of the present invention;

FIG. 2D is a vehicle following another. vehicle diagram in accordance with another application of the present invention;

FIG. 3 is a block diagrammatic view of an inter-vehicle communication system in accordance with another embodiment of the present invention;

DETAILED DESCRIPTION OF THE PREFERRED EMBODIMENT

Figure 1:
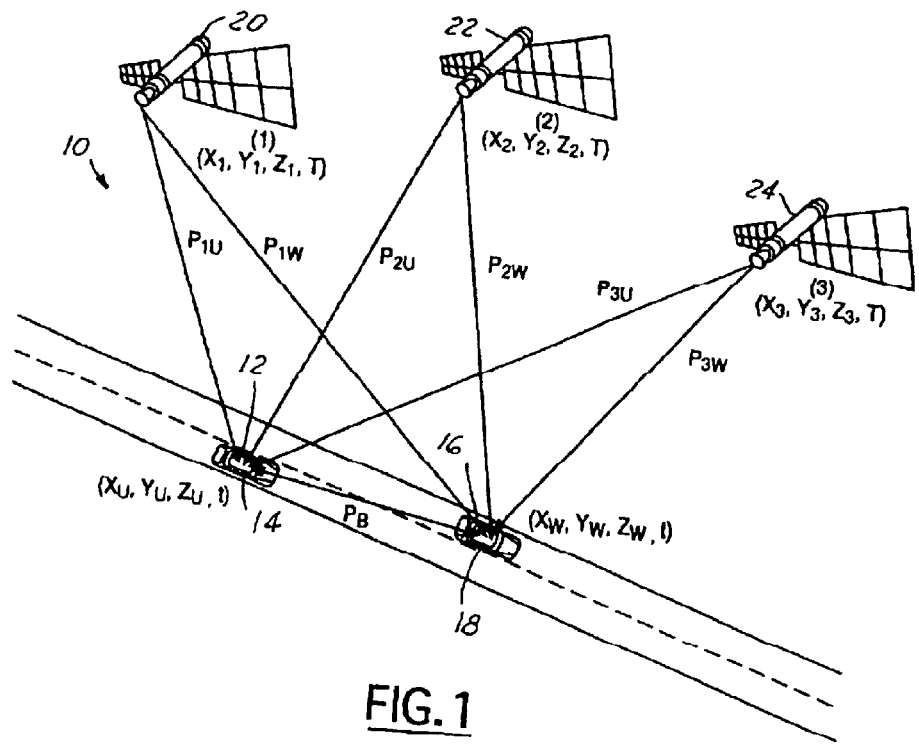
FIG. 1 is a relative positioning system in accordance with one embodiment of the present invention.

In each of the following figures, the same reference numerals are used to refer to the same components. While the present invention is described with respect to a method and apparatus for communicating between multiple vehicles in close proximity to each other, the present invention may be adapted for use in various systems including: automotive vehicle systems, control systems, communication systems, or other systems that may utilize GPS or the like.

In the following description, various operating parameters and components are described for one constructed embodiment. These specific parameters and components are included as examples and are not meant to be limiting.

Referring to FIG. 1, a relative positioning system 10 is illustrated. The system 10 includes a first vehicle 12 including a GPS-Bluetooth system 14, which will be discussed later, a second vehicle 16 also including a GPS-Bluetooth system 18, and a set of satellites (here illustrated as a first 20, second 22 and third 24) communicating with the GPS-Bluetooth 14, 18 on board the vehicles 12, 16. GPS-Bluetooth improves GPS for vehicle navigation and other purposes as well as vehicle safety, navigation, crash and pre-crash sensing.

In the present embodiment, a GPS is fused with Bluetooth radios to form the GPS-Bluetooth 14 and to generate a robust proximity device using typical vehicle equipment. GPS devices are packaged with Bluetooth radios which are capable of finding the distance between the two devices, transmitting satellite range information and synchronizing devices on multiple vehicles.

FIGS. 2A–D illustrate different scenarios in which the GPS-Bluetooth 14, 18 is useful. These scenarios will be discussed in detail later.

Referring now to FIGS. 1 and 3, a vehicle system 50 including an inter-vehicle relative positioning or GPS-Bluetooth system 14, in accordance with an embodiment of the present invention, is illustrated. Relative positioning refers to the position of the first vehicle 12 relative to the second vehicle 16. One skilled in the art will realize the importance of relative positioning in pre-crash and crash avoidance systems.

The system 50 includes a GPS antenna 54 electrically coupled to a GPS unit 68. The GPS unit 68 includes a Radio Frequency (RF) unit 56, a Digital Signal Processor 57, and a Central Processing Unit 58 (controller). The RF unit 56 is electrically coupled to a Digital Signal Processor 57, which is electrically coupled to the controller 58. The controller 58 is also electrically coupled to a first Bluetooth radio 60 (master) and a second Bluetooth radio 62 (slave) and to a vehicle network 64, which generates a network signal. The vehicle network signal may include vehicle proximity information relative to the first vehicle 12, as will be understood by one skilled in the art.

The satellites 20, 22, 24 send radio signals to the GPS antenna 54 so that the GPS can determine the distance to each satellite.

The GPS antenna 54 receives position signals from the satellites 20, 22, 24 for the first vehicle 12 and the second vehicle 16 and generates therefrom an antenna GPS signal.

The RF unit 56 receives the antenna GPS signal and isolates the applicable signals from the satellites and generates GPS signals in response thereto. The Digital Signal Processor 57 receives the GPS signals and takes the real-time, high-speed GPS signals and manipulates them to generate positioning data, as will be understood by one skilled in the art.

The controller 58 is preferably microprocessor-based such as a central processing unit coupled to memory (RAM and/or ROM) and associated input and output buses. The controller 58 can stand alone or be part of another controller such as an Engine Control Unit or a Powertrain Control Module.

The controller 58 combines vehicle information received from the GPS antenna 54 and the vehicle network 64. The global positioning system 68 receives timing and vehicle data via the GPS antenna. 54 and generates a global positioning signal, through the RF unit 56 and the digital signal processor 57, that is utilized by the controller 58 for generating a GPS-Bluetooth relative position signal.

The controller 58 controls routing of various information between vehicle electronic devices including through the GPS-Bluetooth relative position signal. Responsive vehicle devices include the first Bluetooth device 60, the global positioning system 68, and other possible vehicle components not shown such as: a navigation system, object detection sensors, countermeasure systems, or other vehicle electronic devices and components.

Time domain of the controller 58 is divided into periods, in each period at least one specific function is performed. Vehicles utilizing the GPS-Bluetooth 14, which are in close proximity with each other, are synchronized dynamically in order to perform the specific functions in an appropriate sequential order. The specific functions may include: inquiry and discovery of vehicle related data, transmitting and receiving data to and from a vehicle forward of or behind the first vehicle 12, or transmitting and receiving data to vehicles that are to the left or to the right of the first vehicle 12. The time domain may be synchronized through the use of the GPS system 68, or by other methods known in the art.

System-on-chip designs are alternately included thereby electrically coupling the GPS unit 68, the controller 58 and the Bluetooth radios 60, 62 on a single chip.

Normal GPS positioning can be augmented by using GPS devices fitted with Bluetooth radios that communicate with the vehicles within an area through a single piconet.

A piconet is a collection of devices connected via Bluetooth technology in an ad hoc fashion. A piconet starts with two connected devices, such as a portable PC and cellular phone, and may grow to eight connected devices. All Bluetooth devices are peer units and have identical implementations. When establishing a piconet, however, one unit (in the present embodiment, the first Bluetooth radio 60) will act as a master and the other(s) Bluetooth radio(s) as slave(s) for the duration of the piconet connection. All devices have the same physical channel defined by the master device parameters. A piconet is also formed when the first Bluetooth radio 60 is on the first vehicle 12 and a second Bluetooth radio 62 is on the second vehicle 16.

The present invention is embodied with two Bluetooth radios 60, 62 wherein the first Bluetooth radio 60 generates discovery services and the second Bluetooth radio 62 generates range and synchronization. The Bluetooth radios 60, 62 are tightly coupled to the GPS unit 68 so Bluetooth can synchronize a system clock and transfer information rapidly. The Bluetooth radios 60, 62 must be equipped for range finding, synchronization and Doppler velocity measurements. The GPS-Bluetooth 14 can be either battery powered or externally powered.

The first Bluetooth radio 60 communicates with other GPS-Bluetooth on other vehicles and the second Bluetooth radio 62 communicates with ancillary devices. Important to note is that alternate embodiments include only one Bluetooth radio per vehicle. The present invention includes a GPS-Bluetooth Frequency Hopping Spread Spectrum (FHSS) methodology for communication between the GPS 68 and Bluetooth units 60, 62.

The GPS-Bluetooth 14 is adapted for use with cars, trucks, boats, busses, bicycles, pedestrians and almost any vehicle that requires proximity measurements to vehicles or objects in the vicinity. The GPS-Bluetooth 14 can also be placed at stationary locations, such as intersections, docks, shopping malls, urban canyons, etc. to supplement normal GPS.

In one embodiment, a first Bluetooth radio 60 is attached to a GPS 68 to transfer data to other Bluetooth radios (e.g. a second Bluetooth radio 62) attached to the GPS 68 to support Differential GPS and interferometric methods such as Carrier-Phase Differential GPS.

GPS on multiple vehicles connected by Bluetooth radios share ephemeris information, speeding the cold start process for GPS receivers. If a GPS unit does not have current information on the location of the satellites 20, 22, 24 it normally takes 12.5 to 25 minutes to download the complete set from the satellites. A receiver equipped with Bluetooth connects with a similarly equipped receiver that has current ephemeris data and downloads it immediately.

Time synchronization is achieved for a group of GPS receivers with Bluetooth radios if two or more radios are used on each GPS receiver. In this way each radio can have a direct connection to more than one neighbor creating a mesh topology network on which the synchronization is performed.

Time synchronization is also achieved for a group of GPS receivers with Bluetooth radios when each GPS receiver has only one Bluetooth radio. In this case synchronization is achieved using a piconet or scatternet Bluetooth configuration between two vehicles.

The range, velocity measurement, and time synchronization possible with the Bluetooth protocol allow a reduction in the number of satellites or pseudolites that must be visible to a group of GPS receivers. These benefits also increase the accuracy of the PVT measurements.

The aforementioned system components can be packaged into a self-contained package and can be installed in new vehicles or as a retrofit into vehicles not so equipped. The GPS-Bluetooth 14 uses at least one Bluetooth radio to communicate with other devices in the vehicle 12 such as the navigation system, a Telematics computer and safety devices as required.

The vehicle network 64 may be an internal or external vehicle network. The controller 58 may be electrically coupled to the vehicle network 64 via a personal computer memory card international association (PCMCIA) port, a Cardbus, a miniature card, an instrumentation, systems, and automation society (ISA) bus, a peripheral component interface (PCI) bus, or other port, bus, or card known in the art. The vehicle network 64 may contain a central computer or storage center for vehicle network information contained within the network signals.

Rather than including two GPS units in the first vehicle 12 to compute position, velocity and time (PVT) information, and transmitting it between the vehicles 12, 16, one embodiment includes a Bluetooth connection established between the GPS 68 on the first vehicle 12 (vehicle a) and the GPS on the second vehicle 16 (vehicle b). This connection is designed to compute the range velocity from the Doppler effect and to synchronize the two units. This is achieved within the first vehicle 12 central processing unit through the following equations (in view of FIG. 1):

The position of vehicles a and b (first and second vehicles 12, 14) can be computed by solving the following system of equations:

$$P_{a,b} = \sqrt{(x_a - x_b)^2 + (y_a - y_b)^2 + (z_a - z_b)^2},$$

where $P_{a,b}$=Measured range between vehicles 12, 16 through Bluetooth ranging, as illustrated in FIG. 1.

$$P_a^J = \sqrt{(x_a - x_J)^2 + (y_a - y_J)^2 + (z_a - z_J)^2} + ct; \text{ for } J = 1 \ldots N; N < 2.$$

$$P_b^J = \sqrt{(x_b - x_J)^2 + (y_b - y_J)^2 + (z_b - z_J)^2} + ct; \text{ for } J = 1 \ldots N; N < 2.$$

Where $P_a^J$=Range (distance) between the vehicle a and the satellite J. Range is computed by "time of flight" and velocity (rate of change in range) by Doppler shift.

And $X_N$=X coordinate of object N in Earth Centered Coordinates. $Y_N$=Y coordinate of object N in Earth Centered Coordinates. $Z_N$=Z coordinate of object. N in Earth Centered Coordinates. N=a, b, c, d . . . for car a, b, c, d . . . or 1, 2, 3 for satellites 1, 2, 3. Only those satellites that are visible will be included in the list of J satellites.

$P_b^J$=Distance between the satellite J and the vehicle b, $P_{a,b}$=Distance between Vehicle a and b determined by Bluetooth range finding, $\{x_a, y_a, z_a\}$=Position of vehicle a, $\{x_b, y_b, z_b\}$=Position of Vehicle b, and t=Time difference between the synchronized GPS receivers and the satellite 20.

The system of equations for velocity is identical to that of position, except the ranges between vehicles is replaced by the rate of change in range. Rate of change is typically determined using Doppler shifts rather than time of flight for the range calculation. That is:

$$\dot{P}_a^J = \sqrt{(\dot{x}_a - \dot{x}_J)^2 + (\dot{y}_a - \dot{y}_J)^2 + (\dot{z}_a - \dot{z}_J)^2} + c\dot{t}; \text{ for } J = 1 \ldots N; N < 2.$$

Where $\dot{P}_a^J$=Time rate of change in distance between the satellite J (e.g. any one of satellites 20, 22, 24) and the vehicle a (first vehicle 12).

$$\dot{P}_b^J = \sqrt{(\dot{x}_b - \dot{x}_J)^2 + (\dot{y}_b - \dot{y}_J)^2 + (\dot{z}_b - \dot{z}_J)^2} + c\dot{t}; \text{ for } J = 1 \ldots N; N < 2.$$

Where $\dot{P}_b^J$=Time rate of change in distance between the satellite J and the vehicle B (second vehicle 16).

$$\dot{P}_{a,b} = \sqrt{(\dot{x}_a - \dot{x}_b)^2 + (\dot{y}_a - \dot{y}_b)^2 + (\dot{z}_a - \dot{z}_b)^2}.$$

Where $\dot{P}_{a,b}$=Time rate of change in distance between vehicle a and b determined by Bluetooth range finding. And $\{\dot{x}_J,\dot{y}_J,\dot{z}_J\}$=Velocity of satellite J. Unknowns include $\{\dot{x}_a,\dot{y}_a,\dot{z}_a\}$=Velocity of vehicle a, $\{\dot{x}_b,\dot{y}_b,\dot{z}b\}$=Velocity of vehicle b, and $\dot{t}$=Time rate of change in the time difference between the synchronized GPS receivers and the satellite system.

Important to note is that alternate forms of the aforementioned equations are also included in the present invention. In other words, in the case of two vehicles a, b where a sees satellites 3, 6 and 8 and b sees satellites 1, 6 and 8, the system of equations follows in which there are seven equations and seven unknowns ($X_a$, $Y_a$, $Z_a$, $X_b$, $Y_b$, $Z_b$, t):

$$P_{a,b} = \sqrt{(X_a - X_b)^2 + (Y_a - Y_b)^2 + (Z_a - Z_b)^2} \text{ Range (distance)}$$

from car "a" to car "b".

$$P_a^3 = \sqrt{(X_a - X_b)^2 + (Y_a - Y_b)^2 + (Z_a - Z_b)^2} + ct \text{ Range (distance)}$$

from car "a" to Satelite "3."

$$P_a^6 = \sqrt{(X_a - X_6)^2 + (Y_a - Y_6)^2 + (Z_a - Z_6)^2} + ct \text{ Range (distance)}$$

from car "a" to Satelite "6."

$$P_a^8 = \sqrt{(X_a - X_8)^2 + (Y_a - Y_8)^2 + (Z_a - Z_8)^2} + ct \text{ Range (distance)}$$

from car "a" to Satelite "8."

$$P_b^1 = \sqrt{(X_b - X_1)^2 + (Y_b - Y_1)^2 + (Z_b - Z_1)^2} + ct \text{ Range (distance)}$$

from car "b" to Satelite "1."

$$P_b^6 = \sqrt{(X_b - X_6)^2 + (Y_b - Y_6)^2 + (Z_b - Z_6)^2} + ct \text{ Range (distance)}$$

from car "b" to Satelite "6."

$$P_t^J = \sqrt{(X_t - X_J)^1 + (Y_t - Y_J)^2 + (Z_t - Z_J)^3} + ct \text{ Range (distance)}$$

from car "b" to Satelite "8."

More generally, the system of equations for many cars a, b, c, d . . . and many satellites 1, 2, 3, 4 . . . . Can be stated as:

$$P_{m,n} = \sqrt{(X_m - X_n)^2 + (Y_m - Y_n)^2 + (Z_m - Z_n)^2}$$

where $P_{m,n}$ is a list of equations for each vehicle m=a, b, c, d . . . and vehicle n=a, b, c, d . . . such that m≠n and $P_{m,n}$ is known.

$$P_m^{Ja} = \sqrt{(X_a - X_3)^2 + (Y_a - Y_3)^2 + (Z_a - Z_3)^2} + ct$$

where $P_{a,J}$ is a list of equations for each vehicle m=a, b, c, d . . . and each satellite $J_m$ for which range and position information is known.

Navigation data, vehicle speed data, accelerometer data, etc. can be used to augment the solution to the aforementioned equations both for improved accuracy and for temporary satellite disappearance situations.

The solution to the aforementioned system of equations is accomplished through a direct solution, iterative solution, or Kahlman filter.

To locate each vehicle requires at least one equation for each unknown. The number of unknowns is:

U=3$N_{v+}$1. Where: $N_v$, =number of vehicles.

The number of equations is determined by:

$N_e$=$N_{m,n}$+$N_m^J$. Where: $N_{m,n}$=number of known ranges between vehicles from Bluetooth. $N_m^J$=number of known ranges between satellites and vehicles. The value of $N_{m,n}$ depends on the topography of the network between the vehicles. With a typical Bluetooth piconet or the network depicted in FIG. 4, the range is known between the master and each of the slaves, or: $N_{m,n}$=$N_v$–1. Other network topologies could have a different relationship between the number of vehicles and the number of known ranges between the vehicles.

Figure 2A:
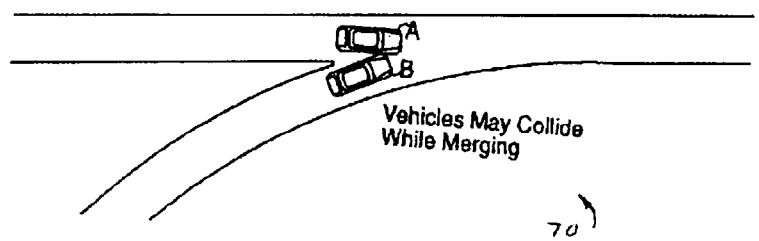
FIG. 2A is a vehicle merging diagram in accordance with one application of the present invention.

Referring again to FIGS. 2A–2D, several collision scenarios are illustrated in which GPS-Bluetooth can be applied for collision avoidance. These include merging/lane change 70 of vehicles a and b, road intersection 72 of a and b, approaching head-on 74 of a and b, and following 76 of a by b. FIG. 2A illustrated is a possible collision by two merging vehicles a, b. FIG. 2B illustrates a vehicle collision at an intersection. FIG. 2C illustrates a vehicle a passing a slower vehicle c and moving to a head-on collision with vehicle b. FIG. 2D illustrates vehicle a decelerating behind a stopped vehicle b while vehicle c is approaching in the opposite lane.

If the aforementioned equations indicate a collision will occur in a short time, the damage of the collision can be mitigated by deploying collision devices in advance of the collision. Further, over a longer time period, if a collision is possible, corrective measures may be taken in response to the shared and synchronized Bluetooth signals.

Figure 4:
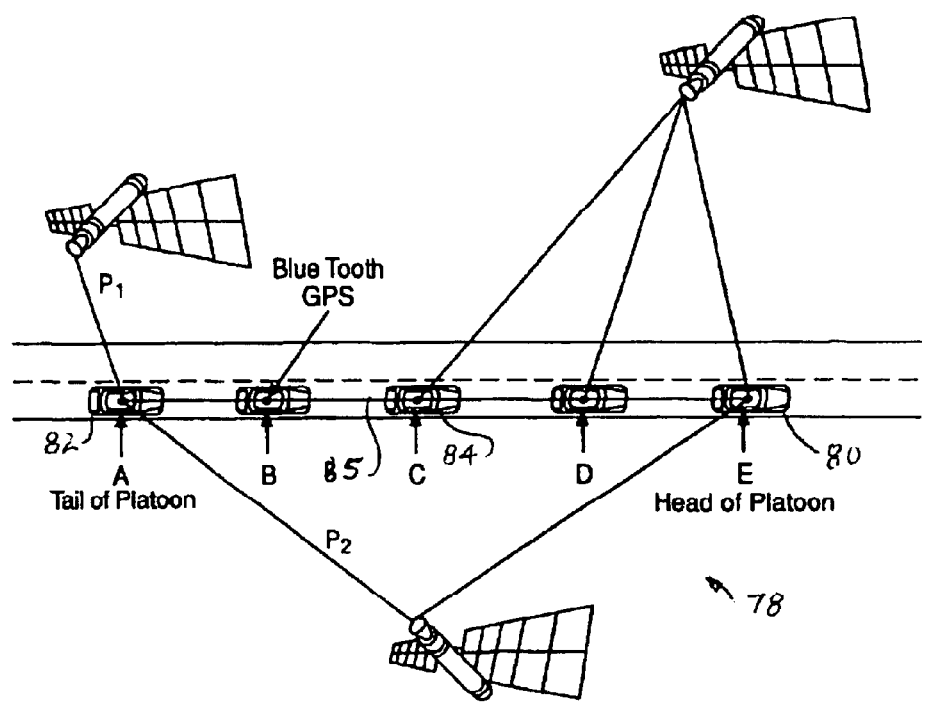
FIG. 4 is a relative positioning system in accordance with another embodiment of the present invention.

FIG. 4 illustrates the use of GPS-Bluetooth to support a system 78 for platooning vehicles. When vehicles platoon they move into groups of tightly spaced vehicles. This improves vehicle aerodynamics for fuel economy and creates open spaces in the traffic flow for congestion control. To successfully platoon, vehicles must implement control algorithms that use position, velocity and other parameters to control the speed of each vehicle. Illustrated are several vehicles (a, b, c, d, e) with Bluetooth links between vehicles in the platoon that are both ahead and behind (except for the vehicles in the front 80 and back 82 of the platoon 85). In another embodiment the GPS-Bluetooth may be connected in a Bluetooth piconet.

In one embodiment, at least one satellite-GPS link is required per vehicle in the middle 84, two for the front and rear vehicles (e and a), and an additional one is required for timing. For a second case, two satellites-GPS links per middle vehicle 84 are required, three for the front and rear vehicles (e and a) and one more somewhere in the platoon 85. Other information and assumptions can be made in a platoon to further reduce the number of satellite-GPS links and/or accuracy improvements by using other information such as navigational data, velocity and acceleration data that may already be available on the vehicle. For example, the fact that the vehicles (a, b, c, d, e) travel on the earth can reduce the dependency on satellite information.

GPS-Bluetooth generates the necessary information for a human operator or a control system to join a number of vehicles in a formation. A common formation is the platoon 65, which is used to reduce total wind drag on a group of vehicles (a, b, c, d, e) and to provide breaks in traffic for congestion control.

The combination of Bluetooth and global positioning systems in multiple vehicles allows for more effective arbitration of communication between vehicles. For example, instead of using request to send and clear to send commands and various handshaking protocols, synchronized communication between the vehicles may occur. In a first time interval, messages may be transmitted in a forward direction from vehicle a to vehicle b, followed by vehicle b transmitting messages to vehicle c, followed by vehicle c transmitting messages to vehicle d, and finally vehicle d transmitting messages to vehicle e. In a second time interval, messages may be transmitted in a rearward direction, from vehicle e to vehicle d, from vehicle d to vehicle c, from vehicle c to vehicle b, and finally from vehicle b to vehicle a. By synchronizing transceivers in multiple vehicles by a global clock signal from the global positioning units, pattern signals may be altered in unison, reducing interference between transceivers in close proximity.

Figure 5:
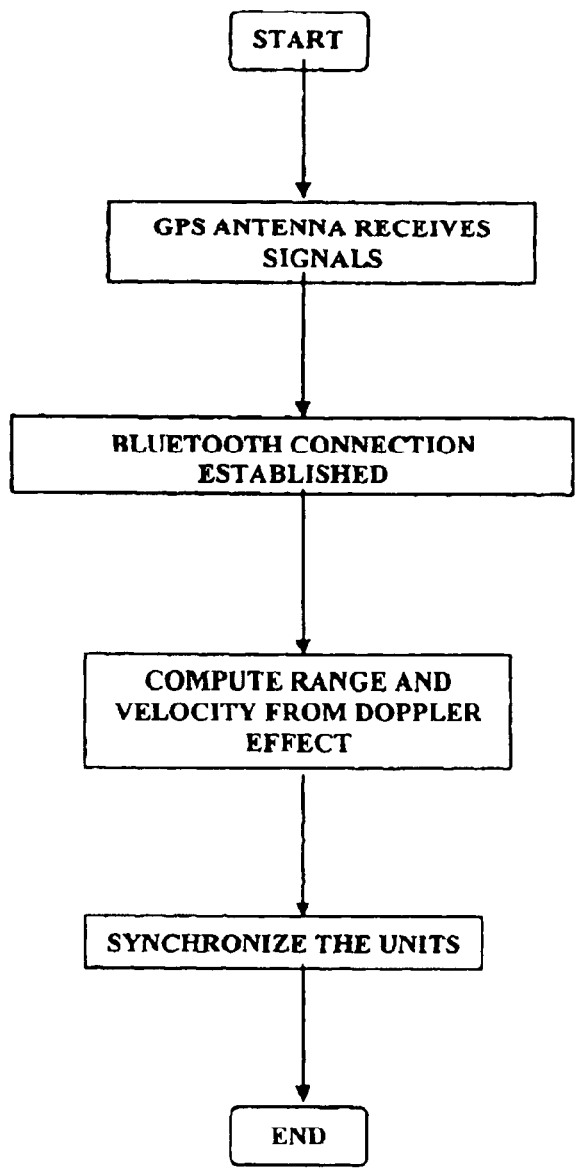
FIG. 5 is a logic flow diagram of a method for relative vehicle positioning in accordance with another embodiment of the present invention.

Referring now to FIG. 5, a logic flow diagram 98 illustrating a method relative positioning, in accordance with an embodiment of the present invention, is illustrated.

Logic begins in operation block 100 where the GPS antenna receives a vehicle signal from a vehicle in close proximity to the first vehicle or from a stationary point. The vehicle signal may be in the form of a vehicle-to-vehicle communication signal. The vehicle signal may include vehicle information relative to the first vehicle such as vehicle traveling velocity, vehicle distance, vehicle location, or other vehicle information known in the art. The vehicle information may pertain to the first vehicle or one or more vehicles in close proximity to the first vehicle.

In operation block 102, the Bluetooth connection is established between two GPS. The GPS are located on at least two vehicles, a vehicle and a stationary object, or a platoon of vehicles.

In operation block 104, the Bluetooth connection is used to share information between the two GPS. Range and velocity are computed from the Doppler effect.

In operation block 106, the two GPS units are synchronized. Equations to compute location, range and velocity were discussed regarding FIG. 1. Other forms of the equations are also included in the present invention. For example, navigation data, vehicle speed data and accelerometer data can be used to improve accuracy of calculations using the above equations.

The GPS-Bluetooth Frequency Hopping Spread Spectrum (FHSS) methodology can be adapted to other communications protocols that can synchronize and be used for range measurements. Some of these protocols are Orthogonal Frequency Division Multiplexing (OFDM), Ultra-wide bandwidth (UWB) communications, and Direct-Sequence Spread Spectrum.

The above-described operation blocks are meant to be an illustrative example, the operation blocks may be performed synchronously or in a different order depending upon the application.

Also throughout the above-described operation blocks, the controller or the vehicle network may be continuously collecting and sorting incoming vehicle related data contained within signals, such as the GPS signal, the synchronization signal from the Bluetooth radios, the network signal, or other vehicle related signals. The vehicle related data may be stored and partitioned for the various specific functions, mentioned above.

In operation, the Bluetooth devices communicate satellite range and ephemeris data by normal Bluetooth communication. This makes it possible to use the Bluetooth radio connections to reduce the number of satellites required to be visible to the GPS while improving the accuracy of the measurements.

The method of the present invention for communicating between vehicles having GPS-Bluetooth devices includes receiving timing and vehicle data, generating a GPS signal, computing range and velocity through Doppler shift, sharing information between the Bluetooth devices, and synchronizing the GPS-Bluetooth devices.

The present invention incorporates the advantages associated with Bluetooth and global positioning systems with commonly used vehicle electronic devices and additional control logic into a single inter-vehicle wireless communication and warning system. The present invention is self-supporting, has quick communication capability between vehicles, and has no single point of failure allowing safety related data to be reliably and quickly communicated. The present invention also provides quick switching, direct communication, and minimum interference of pattern signals.

Using this method fewer satellites need to be visible to each GPS unit to get a position and velocity solution. If additional satellites are visible these can be used to improve the accuracy of the solution. Most importantly for pre-crash sensing the distance between the vehicles is known very precisely, so the time to impact can be accurately computed.

The above-described apparatus and method, to one skilled in the art, is capable of being adapted for various purposes and is not limited to the following systems: automotive vehicle systems, control systems, communication systems, or other systems that may utilize a smart antenna or the like. The above-described invention may also be varied without deviating from the spirit and scope of the invention as contemplated by the following claims.

What is claimed is:

1. A relative vehicle positioning system for a first vehicle comprising:

a GPS antenna adapted to receive satellite signals generated in response to relative vehicle positioning and generate therefrom a GPS signal;

a first Bluetooth radio coupled to the first vehicle and adapted to exchange bearing information with a second vehicle and generate therefrom a PVT signal;

a second Bluetooth radio coupled to the first vehicle and adapted to synchronize the first vehicle with said second vehicle; and a GPS unit comprising a controller adapted to receive said GPS signal and said PVT signal and generate therefrom, a GPS-Bluetooth relative position signal.

2. The system of claim 1 wherein said second Bluetooth radio is adapted to transfer data to other Bluetooth radios attached to said GPS unit to support Differential GPS and interferometric methods.

3. The system of claim 1 wherein said second Bluetooth radio and a third Bluetooth radio on said second vehicle generate a mesh topology network on which said synchronization is performed.

4. The system of claim 1 wherein a time synchronization is generated between said first Bluetooth radio and a second Bluetooth radio on said second vehicle through a piconet Bluetooth configuration.

5. The system of claim 1 wherein said GPS-Bluetooth generates a platoon signal whereby a human operator or a control system receive said platoon signal and control a number of vehicles in a formation in response thereto.

6. The system of claim 1 wherein said GPS-Bluetooth is either battery powered or externally powered.

7. The system of claim 1 wherein a second GPS-Bluetooth is coupled to a stationary location.

8. The system of claim 1 wherein said GPS-Bluetooth is adapted to use communication protocols that can synchronize and be used for range measurements.

9. A relative vehicle positioning system for a first vehicle comprising:
   a GPS antenna adapted to receive satellite signals generated in response to a relative vehicle positioning and generate therefrom a GPS signal;
   a first Bluetooth radio adapted to exchange bearing information with a second vehicle and generate therefrom a PVT signal;
   a second Bluetooth radio coupled to the first vehicle adapted to synchronize the first vehicle with said second vehicle;
   a vehicle network adapted to generate a network signal; and
   a GPS unit comprising a controller adapted to receive said GPS signal, said PVT signal and said network signal, and generate therefrom, a GPS-Bluetooth relative position signal.

10. The system of claim 9 wherein said second Bluetooth radio is adapted to transfer data to other Bluetooth radios attached to said GPS unit to support Differential GPS and interferometric methods.

11. The system of claim 9 wherein said second Bluetooth radio and a third Bluetooth radio on said second vehicle generate a mesh topology network on which said synchronization is performed.

12. The system of claim 9 wherein said GPS-Bluetooth is either battery powered or externally powered.

13. A method of communicating between vehicles having GPS-Bluetooth devices comprising:
   receiving timing and vehicle data;
   generating a GPS signal;
   computing range through time of flight and velocity through Doppler shift;
   generating a GPS-Bluetooth relative position signal as a function of said timing and vehicle data, said GPS signal, said velocity and said range;
   sharing information between the Bluetooth devices; and
   synchronizing the GPS-Bluetooth devices.

14. The method of claim 13 wherein sharing further comprises sharing ephemeris information.

15. The method of claim 13 wherein synchronizing further comprises synchronizing a piconet Bluetooth configuration.

16. The method of claim 13 further comprising generating a platoon signal whereby a human operator or a control system receive said platoon signal and control a number of vehicles in a formation in response thereto.

17. The method of claim 13 further comprising activating a vehicle system in response to said position signal, wherein said vehicle system comprises a pre-crash system, a warning system, a navigation system, an avoidance system or a safety system.

* * * * *